United States Patent Office 3,403,019
Patented Sept. 24, 1968

3,403,019
PHOTOCONDUCTIVE ELECTROSTATIC ELEMENTS CONTAINING POLYURETHANES IN THE PHOTOCONDUCTIVE LAYER
Frederick A. Stahly and Richard A. Weitzel, Rochester, N.Y., assignors to Eastman Kodak Company, Rochester, N.Y., a corporation of New Jersey
No Drawing. Filed Feb. 15, 1965, Ser. No. 432,830
5 Claims. (Cl. 96—1.5)

ABSTRACT OF THE DISCLOSURE

The adhesion of photoconductive compositions to conducting substrates in electrophotographic elements is improved by incorporating a small amount of a polyurethane containing reactive isocyanate end groups in the photoconductive composition.

This invention relates to an improvement in the preparation of an electrophotographic element comprising a substrate supporting one or more superimposed layers of photoconductive components, and more particularly, this invention relates to a method of improving the adhesion of such layers to the substrate.

A conventional photoconductive electrostatic element is a sandwich construction of several layers including a supporting substrate, an electrically conductive layer, and a photoconductive insulating layer. When it is desirable, a subbing layer may be applied between the supporting substrate and the electrically conductive layer to enhance the adhesion between the two. The supporting substrate functions as the support for the entire element. The electrically conductive layer may be an organic resin which conducts electricity. The photoconductive layer may be an organic, insulating resin in which is dispersed, as discrete particles or as a solid solution, a material which becomes electrically conductive when subjected to light. The photoconductive layer and the electrically conductive layer tend to strip easily from each other in repeated use and it has now been found that the adhesion between these layers may be greatly improved by incorporating certain cross-linking agents into the materials.

It is an object of this invention to provide a method of improving the adhesion between contiguous layers of a photoconductive electrostatic element. It is another object of this invention to provide a photoconductive electrostatic element having an improved adhesion between a resin-containing electrically conductive layer and an organic photoconductive layer. Other objects will appear in the detailed description of this invention.

The foregoing objects are accomplished by incorporating into the photoconductive layer small amounts of polyurethanes having unreacted isocyanate groups. The resulting photoconductive electrostatic element has (1) a supporting substrate which may or may not be covered with a subbing layer, (2) an electrically conductive, organic resin-containing layer, and (3) a superimposed photoconductive layer comprising an organic resinous binder containing photoconductive material dispersed therein and also containing a small amount of a polyurethane having unreacted isocyanate groups.

The supporting substrate for the transparent elements of this invention may be any suitable transparent film, e.g., cellulose acetate, cellulose triacetate, polystyrene, polymethyl methacrylate, polycarbonate, polyethylene terephthalate, and the like.

This supporting substrate may, optionally, be coated with a subbing layer, which usually is a solution of an organic resin in a relatively volatile solvent. A typical composition to be used as a subbing layer on cellulose triacetate film is a 0.2% solution of methacrylic acid/methyl acrylate copolymer in a mixed solvent comprising 55% acetone, 20% methylene chloride, and 25% ethanol. Other compositions useful as a subbing layer for cellulose triacetate film or for other film supports will be apparent to those skilled in the art of photography.

The electrically conductive, organic resin-containing layer is applied as a coating directly onto the supporting substrate or onto the subbing layer if the supporting substrate has been so treated. This conductive layer may be any of several coating compositions that are electrically conductive. One of the most desirable conductive coating compositions is a class of water-soluble salts of carboxyester-lactones.

In copending patent application Ser. No. 201,808, filed June 12, 1962, now U.S. Patent 3,206,312, by M. D. Sterman and L. M. Minsk, these water-soluble salts of carboxyester-lactones are described. With respect to the present invention, the most important of these compounds are the ammonium salts and the alkali metal salts of the lactones derived from interpolymers of alpha,beta-unsaturated dicarboxylic acids, or their anhydrides, and the vinyl carboxylic acid esters. The salts used may be derived from polymers which result from the reaction of an aliphatic monohydroxy carboxylic acid and a monohydroxy alkanol containing 1–12 carbon atoms with, for example, an interpolymer of vinyl acetate and maleic anhydride as described in U.S. Patent 3,007,901 of Louis M. Minsk. They also may be salts of carboxyester-lactones prepared by the partial hydrolysis of the essentially fully esterified polymers as described by McNally and Van Dyke in U.S. Patent 2,306,071, or, alternatively, they may be salts of carboxyester-lactones prepared directly by heating in the presence of a mineral acid a mixture consisting of a low-viscosity interpolymer of a vinyl organic acid ester and an alpha,beta-unsaturated dicarboxylic acid or its anhydride, water, and an aliphatic alcohol in such a ratio as to provide a polymer containing the desired carboxyl content. The usable carboxy content of the carboxyester-lactone polymers lies between approximately 3.5 and 6 milliequivalents per gram of polymer, preferably between 4.5 and 5.5 milliequivalents per gram, with the optimal value at approximately 5.0 milliequivalents per gram. The salt is conveniently prepared by reacting the carboxyl-containing polymer with an alkaline material such as sodium carbonate, sodium hydroxide, ammonium hydroxide, or the like so that it is 25–98% (optionally 50–95%) neutralized by the alkali metal or ammonium ion.

The preferred method for preparing these products involves the steps of (a) first heating to reacting temperature, under acid conditions, a heteropolymer of a vinyl or isopropenyl organic acid ester and an alpha,beta-unsaturated dicarboxylic acid with a mixture of a monohydroxy acid, a monohydroxy alkanol, water, and an inert solvent, to obtain a resinous carboxyester-lactone having substantial proportions of each of the following recurring structural units:

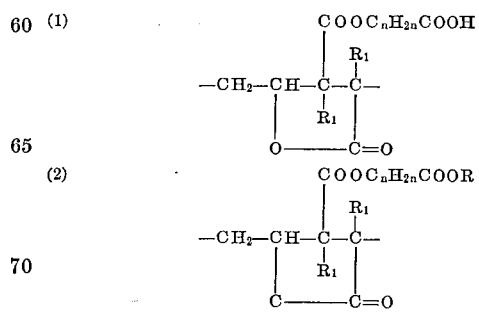

(3)
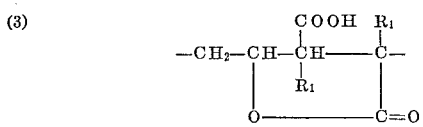

and (4)
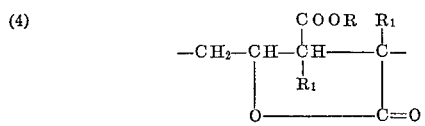

wherein $n$ represents an integer of 1–5, R represents an alkyl group containing 1–12 carbon atoms, e.g., methyl, ethyl, propyl, isopropyl, etc., or a phenylalkyl group wherein the alkyl contains 1–4 carbon atoms, e.g., benzyl, phenylethyl, phenylpropyl, etc., or the corresponding tolylalkyl groups and $R_1$ represents a hydrogen atom or methyl (thus the product can be defined as a mixed carboxyalkyl ester of a monohydroxy acid and monohydroxy alkanol of a lactone of an interpolymer of vinyl alcohol and an alpha,beta-unsaturated dicarboxylic acid) and (b) dispersing the isolated resinous carboxyester-lactone in an appropriate solvent such as acetone, adjusting the pH to 5–8 or preferably 6–7 with an aqueous solution of a base whereby the inherently hydrophobic, unneutralized resinous carboxyester-lactone essentially prepared is converted to the inherently hydrophilic salt of the resinous carboxyester-lactone wherein the original lactone rings remain substantially intact, 25–98% (optionally 50–95%) of the hydrogen of the carboxyl groups having been replaced by the ammonium radical or alkali metal atom. Suitable alkaline reagents for use in this latter step include ammonium hydroxide and the alkali metal hydroxides of lithium, sodium, and potassium. In preparing the intermediate interpolymers used in preparing these materials, the usual and preferred practice is to employ the anhydride of the acid rather than the free dicarboxylic acid itself.

Typical starting interpolymers in step (a) referred to are those prepared from an alpha,beta-unsaturated dicarboxylic acid or its anhydride, such as maleic acid, citraconic acid, dimethylmaleic acid, or anhydrides or 1–4 carbon alkyl esters thereof, fumaric acid, mesaconic acid, dimethylfumaric acid or 1–4 carbon alkyl esters thereof, or any similar dicarboxylic acid, and a vinyl organic acid ester such as vinyl acetate, vinyl propionate, vinyl benzoate or the like. The monohydroxy acids preferred are selected from the lactic acid series such as glycolic acid, lactic acid, hydroxybutyric acid and the like and the monohydroxy alkanols include methanol, ethanol, propanol or the like, up to and including the alcohols of 12 carbon atoms. The reaction for preparing these products is carried out in the presence of a strong acid catalyst such as a mineral acid having an acidity of the order of sulfuric acid.

Other types of electrically conductive compositions are suitably employed for this layer. In the following examples there is a description of the preparation of a composition containing cuprous iodide and poly(vinyl formal) as an electrically conductive material. Many other resin-containing conductive coating compositions will be apparent to the polymer chemist.

The organic photoconductive layer which is superimposed on the electrically conductive layer contains the component of this invention which contributes the improved adhesion. This layer is principally composed of a transparent resin binder having an organic photoconductor dispersed in it and also containing a polyurethane as the cross-linking agent that enhances the adhesion between this layer and the electrically conductive layer.

The transparent organic resin binder may be any of several materials such as a polyester, polystyrene, a polycarbonate, a polyacrylate, and the like. A particularly preferred binder for this use is a polyester made from terephthalic acid and one or more glycols, such a polyester being known as a polymeric terephthalate.

The organic photoconductor is an organic material which is light-sensitive and changes its electrical conductivity when subjected to light. These photoconductors include but are not limited to, triphenylamine, bis(4-diethylamino-2-methylphenyl)phenylmethane, anthracene, acenaphthene, p-diphenylbenzene, benzanthrone, 1,5-dicyanonaphthalene, 1,4-dicyanonaphthalene, aminophthalodinitrile, and nitrophthalodinitrile.

The polyurethane cross-linking agent employed in this invention is one having a small percentage of reactive isocyanate groups. In general these polyurethanes are the reaction products of a natural or synthetic polyhydroxy compound and a diisocyanate, e.g., the product formed by reacting poly(oxypropylene)diol and tolylene diisocyanate. When an excess diisocyanate is employed, the product has some unreacted isocyanate groups terminating the polymer chain, and these isocyanate groups are available for further reaction to produce a cross-linked structure. Because of the latent reactivity of these products they are sometimes referred to as "prepolymers." A discussion of the chemical reactions involved in preparing such products is given in an article by J. W. Britain, entitled "Behavior of Isocyanate-Terminated Prepolymers in the Presence of Various Catalysts," Ind. and Engr. Chem. Prod. Res. and Dev., vol. 1, pages 261–4, December 1962.

The particular prepolymer employed in the practice of this invention is a polyurethane, i.e., polymer having the characteristic group:

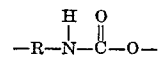

and being derived from the reaction of an excess of a diisocyanate and a polyol. The prepolymer product contains unreacted isocyanate groups, preferably in the amount of 1% to 15% calculated as the percentage of the molecular weight of the prepolymer attributable to unreacted isocyanate (—NCO) groups. These unreacted isocyanate groups are end-groups terminating the polymer chain, which may be linear (thus having two ends) or it may be branched (thus having more than two ends).

The amount of the polyurethane employed in the photoconductive coating is not critical and may vary broadly from about 0.01% to 1.0%, preferably 0.02% to 0.6% based on the total weight of the coating solution employed. If the polyurethane content is based on the total dry solids in the coating, the percentage varies from about 0.1% to about 15%, preferably 0.2% to 7.5%.

When this type of photoconductive layer, i.e., one containing the polyurethane, is coated onto a substrate which has already been coated with an electrically conductive resin, such as the sodium salt of a resinous carboxyester-lactone, the unreacted isocyanate groups are believed to react with hydroxyl groups in each of the two contiguous layers causing cross-linking to occur and thereby to cause the two layers to adhere to each other. This explanation applies, of course, only to embodiments in which the contiguous coatings both contain hydroxyl groups. While the chemical reactions may not occur precisely as has been presumed, there is no difficulty in observing that the adhesion between layers is markedly improved when such a polyurethane is included in the formulation of the photoconductive layer.

This cross-linking reaction may be effected more quickly by the presence of a catalyst or by the application of heat, although such aids may produce adverse photographic effects. It is therefore preferred merely to apply the polyurethane-containing solution at room temperature and to permit the reaction to occur without further assistance. Normally, the reaction is completed in a few minutes.

This invention may be understood more clearly by reason of the following illustrative examples. Parts and percentages are based on weight unless otherwise specified.

Example 1

Cellulose triacetate film base support was coated with a sub-layer by means of a 0.2% solution or methacrylic acid/methyl acrylate copolymer in a solvent consisting of 20 parts methylene chloride, 55 parts acetone and 25 parts ethanol. The subbed support was then overcoated with a 0.5% aqueous solution of the sodium salt of carboxybutyl ester lactone of maleic anhydride-vinyl acetate interpolymer, the solution having a pH of 6. The resulting article constituted a film substrate coated with an electrically conductive coating.

This article was then coated with a mixture having the following composition:

|   | Parts |
|---|---|
| Vitel PE–101X | 18.75 |
| Triphenylamine | 6.75 |
| Mondur CB–75 (75% solids) | 0.057 |
| Methylene chloride | 92.50 |
| Propylene chloride | 92.50 |
| 4-(4-n-amyloxyphenyl)-2,6-bis(4-ethylphenyl) thiapyrylium perchlorate | 0.289 |

Vitel PE–101X is a modified polyethylene terephthalate polyester sold by Goodyear Tire and Rubber Co. Mondur CB–75 (75% solids), a product of Mobay Chemical Co., is a polyurethane derived from tolylene diisocyanate and a polyol, the product being sold in the form of a solution of 75% polyurethane solids dissolved in ethyl acetate and containing less than 1% free tolylene diisocyanate, the polyurethane having about 13% unreacted isocyanate groups.

The resulting product exhibited a much greater adhesion between the photoconductive layer and the electrically conductive layer than did a product prepared identically except to omit Mondur CB–75.

Example 2

Example 1 was repeated using other polyurethanes in place of Mondur CB–75. The following table shows the properties differentiating the various polyurethanes from that used in Example 1. In each instance the adhesion between the electrically conductive layer and the photoconductive layer was greatly improved when the polyurethane was present as compared to the same formulation with the polyurethane absent.

TABLE

|   | Solvent | Percent solids | Percent isocyanate | Percent free tolylene diisocyanate |
|---|---|---|---|---|
| Mondur CB–75 | Ethyl acetate | 75 | About 13 | 1 |
| Mondur CB–60 | do | 60 | About 13 | 1 |
| Spenkel P23–75S | do | 75 | 14.5 | 6 |
| Spenkel DV–1349 | do | 75 | 11.8 | 1 |
| Spenkel DV–1353 | Cellosolve acetate and xylene | 60 | 9.4 | 1 |
| Spenkel DV–1078 | None | 100 | 8.2 |  |

Spenkel is a product of Spencer, Kellogg and Sons, Inc.

Example 3

The substrate and its electrically conductive coating described in Example 1 was coated with the following photoconductive composition:

|   | Parts |
|---|---|
| Lexan 105 polycarbonate (derived from bisphenol A) | 18.75 |
| Bis(4-diethylamino-2-methylphenyl)phenylmethane | 6.25 |
| Mondur CB–75 (75% solids) | 2.40 |
| Methylene chloride | 106.20 |
| Propylene chloride | 35.40 |

Lexan is a trademark of General Electric Co. Substantially improved adhesion was obtained between the electrically conductive layer and the photoconductive layer.

Example 4

Example 3 was repeated using half the amount of Mondur CB–75 (i.e., 1.2 parts) and substantially the same improvement in adhesion was obtained as that found in Example 3.

Example 5

Cuprous iodide (1.4 g.) was dissolved by stirring in 53 ml. of acetonitrile, then 7 ml. of a 5% solution of "Formvar" resin, a poly(vinyl formal) sold by Shawinigan Resins Corp., in acetonitrile was added. The solution was filtered and then whirlcoated onto a polyethylene terephthalate film base to produce a substrate coated with an electrically conductive layer.

The resulting structure was then coated with the following photoconductive composition:

|   | Parts |
|---|---|
| Koppers 8X polystyrene | 37.5 |
| Bis(4 - diethylamino - 2 - methylphenyl)phenylmethane | 12.5 |
| Spenkel P23–75S (75% solids) | 1.2 |
| Methylene chloride | 171.0 |
| Propylene chloride | 57.0 |

Substantially improved adhesion was obtained between the electrically conductive layer and the photoconductive layer as compared to an element prepared identically except that Spenkel was omitted.

Example 6

Example 5 was repeated except that the following formulation was used for the photoconductive coating:

|   | Parts |
|---|---|
| Lexan 105 polycarbonate | 72 |
| Bis(4 - diethylamino - 2 - methylphenyl)phenylmethane | 24 |
| Mondur CB–75 (75% solids) | 2.4 |
| Methylene chloride | 408.0 |
| Propylene chloride | 136.4 |

The same degree of improvement in adhesion over a control element was noted as found in Example 5.

Example 7

Examples 3, 5, and 6 were repeated using in place of the polycarbonate in Examples 3 and 6 and the polystyrene in Example 5, "Lucite 46" (the registered trademark of E. I. du Pont de Nemours & Co., Inc.), which is a copolymer of isobutyl methacrylate and n-butyl methacrylate. In each instance substantially improved adhesion was obtained between the electrically conductive layer and the photoconductive layer when compared with an element prepared identically except to omit the polyurethane material (Mondur CB–75 in Examples 3 and 6, Spenkel P23–75S in Example 5).

The foregoing description and operative examples are intended to be illustrative and not to be restrictive. The scope of this invention is not to be construed as being limited in any manner other than that found in the appended claims.

We claim:

1. A photoconductive electrostatic element suitable for use in making photographic images comprising (1) a supporting substrate, (2) a layer containing an electrically conductive organic resin having hydroxyl groups available for cross-linking, and (3) a superimposed photoconductive organic resin layer comprising an organic resin binder having dispersed therein an organic photoconductor material and a small amount of a polyurethane, at least one of the end-groups terminating the polymer chain of said polyurethane being a reactive isocyanate radical.

2. The element of claim 1 in which said electrically conductive organic resin layer is a water-soluble salt of a resinous carboxyester-lactone.

3. The element of claim 1 in which said electrically conductive organic resin layer is an alkali metal salt of a carboxyester-lactone derived from an interpolymer of an alpha,beta-unsaturated dicarboxylic acid and a vinyl carboxylic acid ester.

4. The element of claim 1 in which the electrically conductive organic resin layer is the sodium salt of carboxybutyl ester lactone of maleic anhydride/vinyl acetate interpolymer.

5. A transparent, photoconductive electrostatic film comprising (1) a transparent organic resin film as the supporting substrate, (2) a first coating on said substrate consisting essentially of a sodium salt of a resinous carboxyester-lactone of an interpolymer of an alpha,beta-unsaturated dicarboxylic acid and a vinyl carboxylic acid ester, and (3) a second coating superimposed on said first coating comprising a resinous polymeric terephthalate containing an organic photoconductor and 0.1% to 15% of a polyurethane based on the dry weight of said second coating, said polyurethane containing 1% to 15% by weight unreacted isocyanate end-groups.

References Cited

UNITED STATES PATENTS

| 2,940,848 | 6/1960 | Kostelec et al. | 96—1 |
| 2,986,467 | 5/1961 | Kostelec et al. | 96—1 |
| 3,095,301 | 6/1963 | Kostelec et al. | 96—1 |
| 3,244,516 | 4/1966 | Neugebauer et al. | 96—1 |

NORMAN G. TORCHIN, *Primary Examiner.*

J. C. COOPER, *Assistant Examiner.*